US012694153B1

(12) United States Patent
Chud

(10) Patent No.: US 12,694,153 B1
(45) Date of Patent: Jul. 28, 2026

(54) OPTIMIZATION OF SECONDARY MEDIA CONTENT SELECTION FOR INSERTION IN PRIMARY MEDIA CONTENT BY USE OF BULK DIRECTORY AND MATCHING CRITERIA VIA IMMUTABLE BLOCKCHAIN

(71) Applicant: Amazon Technologies, Inc., Seattle, WA (US)

(72) Inventor: Andrew Christopher Chud, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 79 days.

(21) Appl. No.: 18/590,816

(22) Filed: Feb. 28, 2024

(51) Int. Cl.
*G06F 21/62* (2013.01)
*G06F 16/27* (2019.01)
*G06F 21/60* (2013.01)

(52) U.S. Cl.
CPC .......... *G06F 21/6263* (2013.01); *G06F 16/27* (2019.01); *G06F 21/602* (2013.01)

(58) Field of Classification Search
CPC ..... G06F 21/6263; G06F 16/27; G06F 21/602
See application file for complete search history.

(56) References Cited

U.S. PATENT DOCUMENTS

| | | | | |
|---|---|---|---|---|
| 2018/0096163 | A1* | 4/2018 | Jacques De Kadt | ........................ G06F 21/6227 |
| 2020/0027133 | A1* | 1/2020 | Segalov | .............. G06F 21/6263 |
| 2023/0186417 | A1* | 6/2023 | Luginbill | ............. G06Q 50/184 705/310 |
| 2024/0311826 | A1* | 9/2024 | Irazábal | ............... G06Q 20/401 |

OTHER PUBLICATIONS

Finance Magnates, "Alkimi Launches Mainnet; Bringing $600 Billion Industry On-Chain," Dec. 19, 2023 [retreived Mar. 28, 2024 from https://www.financemagnates.com/thought-leadership/alkimi-launches-mainnet-bringing-600-billion-industry-on-chain/], 3 pages.
Uphold, "What is Alkimi ($ADS), and How Does it Work?," Apr. 21, 2023 [retrieved Mar. 28, 2024 from https://uphold.com/blog/airdrops/what-is-alkimi-how-does-it-work], 2 pages.

* cited by examiner

*Primary Examiner* — Nicholas R Taylor
*Assistant Examiner* — Tania M Pena-Santana
(74) *Attorney, Agent, or Firm* — Davis Wright Tremaine LLP

(57) ABSTRACT

A method and system to provide acquired sets of secondary media content. The method may include identifying, in a first cryptographically protected record in a distributed database, one or more available sets of secondary media content to be provided, causing a second cryptographically protected record to be written to the distributed database that indicates an acquisition of the one or more available sets, and causing the one or more acquired available sets to be provided.

20 Claims, 7 Drawing Sheets

500

Receiving Information Indicating Secondary Media Content was Provided — 602

Validating Provision of Secondary Media Content — 604

Updating Validation Count — 606

Validation Period Complete? — 608

No

Yes

Recording Attestation Record — 610

Performing Other Actions — 612

OPTIMIZATION OF SECONDARY MEDIA CONTENT SELECTION FOR INSERTION IN PRIMARY MEDIA CONTENT BY USE OF BULK DIRECTORY AND MATCHING CRITERIA VIA IMMUTABLE BLOCKCHAIN

BACKGROUND

In programmatic provision of secondary media content, secondary media content distribution systems attempt to fill secondary media content provision opportunities with secondary media content via a multi-hop call flow that typically involves a secondary media content server, multiple secondary media content selectors, and multiple secondary media content controllers. Secondary media content provision may include selection and presentation of secondary media content. These call flows can be highly complex, sensitive to latency, network resource intensive, and may have data sharing and privacy concerns due to a user's identity and browsing history being shared with multiple components across the call flow.

BRIEF DESCRIPTION OF THE DRAWINGS

Various techniques will be described with reference to the drawings, in which.

DETAILED DESCRIPTION

Figure 1:
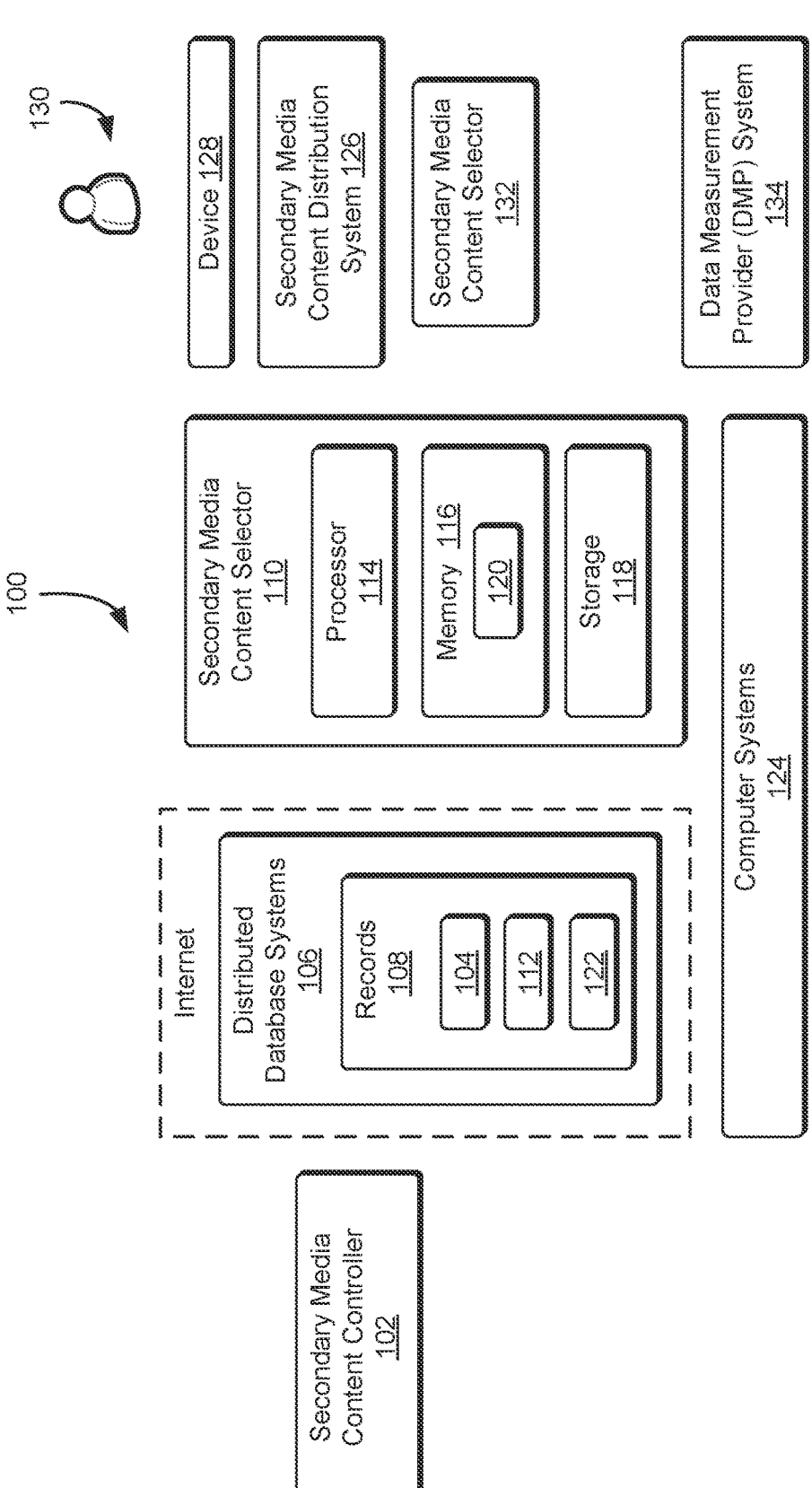
FIG. 1 illustrates an example diagram of an environment in which available sets of secondary media content are acquired and provided.

Techniques described and suggested herein relate to acquiring available sets of secondary media content to be provided, and providing secondary media content of the acquired sets. A distributed database may store a set of cryptographically protected immutable records of various types. In an example, a secondary media content controller stores a type of cryptographically protected record in a distributed database, referred to as an online engagement program configuration, that indicates sets of secondary media content to be provided and matching and/or filtering criteria to be used in providing the secondary media content. A secondary media content selector may predict secondary media content provision opportunities, and store another type of cryptographically protected record in the distributed database, referred to as a lot acquisition, that acquires one or more sets of secondary media content to be provided that match the prediction. The secondary media content selector may then respond to secondary content requests from a secondary media content distribution system using cached information that meets the specified matching and/or filtering criteria to be used in providing the secondary media content. A computer system of a data measurement provider may validate the provision of secondary media content, and store a type of cryptographically protected record in the distributed database that indicates a count of validated provision of secondary media content. This third type of record may be referred to as a secondary content distribution attestation, and/or some other suitable name. Various computer systems and/or entities may store other types of records in the distributed database, including registration records, online engagement program updates, resource hold records, secondary media content lot records, resource return, resource transfer, and/or other suitable types of records. The records stored in the distributed database may be immutable records stored on one or more blockchains. After provision of the secondary media content has been validated and recorded, the secondary media content controller may update the available sets of secondary media content to be provided by recording an additional cryptographically protected online engagement program record in the distributed database.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For example, some embodiments may reduce network resource utilization because secondary media content selectors prefetch sets of secondary media content to be provided in bulk as a set instead of having to fetch each one individually in a real-time online flow. Some embodiments may reduce computational resources used to provide secondary media content, resulting in a reduced carbon footprint and/or reduced carbon emissions. Some embodiments may improve user privacy because secondary media content controllers do not access end-user information. Some embodiments may reduce a latency in responding to secondary content requests. It will be appreciated that this list of advantages is intended to be illustrative and is not exhaustive of possible advantages that can be achieved in light of this disclosure.

FIG. 1 illustrates an example diagram of an environment 100 in which one or more sets of secondary media content to be provided are acquired and provided in accordance with an embodiment. The environment 100 may include a secondary media content controller 102. The secondary media content controller 102 may be referred to as a secondary media content provisioning system, a secondary content management system, and/or some other suitable term. In some embodiments, secondary media content controller 102 causes a first cryptographically protected record 104 to be stored in distributed database systems 106 in a set of records 108. The distributed database systems 106 can be blockchain nodes. The distributed database systems 106 and/or the set of records 108 may be referred to as a distributed secondary content database or some other suitable term. In various embodiments, the set of records 108 is one or more immutable blockchain distributed records. The first cryptographically protected record 104 may include one or more indications of one or more available sets of secondary media content to be provided, one or more indications of one or more systems to be used, and one or more matching and/or filtering criteria. In an embodiment, the secondary media content controller 102 is referred to as a demand side platform (DSP). The first cryptographically protected record 104 may be referred to as a first cryptographically protected entry.

In an embodiment, the first cryptographically protected record 104 is a type of record referred to as an online engagement program record, an online engagement program configuration record, or some other suitable term. The first cryptographically protected record 104 may be cryptographically protected using a cryptographic authenticator (e.g., at least by being signed with a digital signature). Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In at least one embodiment, the first cryptographically protected record 104 includes an online engagement program budget and metadata. Information in the first cryptographically protected record 104 may include an identifier of a location of secondary media content to be provided (e.g., a uniform resource identifier (URI) such as a uniform resource locator (URL) hosted in a content delivery network). The first cryptographically protected record 104 can include a budget and/or a cost (e.g., in cost-per-milli (CPM)). The cost can be an amount of resources to be transferred between entities for providing secondary media content (e.g., causing secondary media content to be served to a user of a device). The first cryptographically protected record 104 can include flight dates/times of when an online engagement program starts and ends. The first cryptographically protected record 104 may include one or more references to registered independent service providers who must be used to meet the criteria to serve the online engagement program's provision of secondary media content. In some embodiments, the first cryptographically protected record 104 includes service provider metadata. Service providers may serve a number of purposes, including viewability, brand safety, identity resolution and desired characteristics, frequency caps, and measurement. The secondary media content controller 102 may specify one or more delivery parameters (e.g., in the first cryptographically protected record 104), such as one or more pacing requirements, to be used by supply-side platforms (SSPs) in providing secondary media content of the online engagement program. The delivery parameters may include specification of delivery conditions for the SSP, such as pace evenly over a time during which a set of secondary media content is to be presented and/or dates and/or times during which an online engagement program is in effect, or pace as fast as possible (e.g., by a front-load delivery of secondary media content). The secondary media content controller 102 may include and/or perform one or more capabilities of one or more service providers. In some embodiments, secondary media content controller 102 may use one or more third-party service providers to perform one or more aspects to be performed by one or more indicated service providers. The secondary media content controller 102 may record multiple versions of an online engagement program with different criteria at different cost points (e.g., resolved identity with desired behavioral characteristics at a higher cost than contextual only). In some embodiments, such variants are defined as lots of impressions that are available, each with slightly different criteria. In some embodiments, the information of the first cryptographically protected record 104 may be included in multiple cryptographically protected records and/or types of cryptographically protected records, such as in an online engagement program configuration record, one or more secondary media content lot records (e.g., of the online engagement program specified by the online engagement program configuration record), one or more online engagement program update records, and/or other types of cryptographically protected records.

In some embodiments, a secondary media content selector 110 causes a second cryptographically protected record 112 to be written to distributed database systems 106. The secondary media content selector 110 may be referred to as a secondary media content provider and/or some other suitable term. The second cryptographically protected record 112 may be cryptographically protected using a cryptographic authenticator (e.g., at least by being signed with a digital signature). The second cryptographically protected record 112 may be stored in set of records 108 and may indicate an acquisition of one or more of the one or more available sets of secondary media content to be provided indicated in the first cryptographically protected record 104. Each set, also referred to as a lot, of secondary media content to be provided can include a particular number of times the secondary media content is to be provided, and a timeframe (e.g., start and end dates and/or times) to provide the secondary media content. The second cryptographically protected record 112 may be a type of record referred to as a lot acquisition record, a secondary media content acquisition record, and/or some other suitable term. The acquisition may be referred to as a lot acquisition, a bulk acquisition, and/or some other suitable term. In some embodiments, acquiring an available set of secondary media content to be provided by recording a record indicating the acquisition in the distributed database causes the acquired set to not be available to other secondary media content selectors until the acquisition expires. The acquisition record may be recorded as an immutable blockchain record after validation of the record by validation nodes, with attempts to record acquisitions not indicated to be available resulting in a validation failure and not being recorded. The set of various types of records stored in the distributed database systems 106 may be referred to as a secondary content directory, a bulk directory, a secondary content catalog, a bulk catalog, and/or some other suitable term.

The secondary media content selector 110 can include a processor 114, a memory 116, and storage 118. In at least one embodiment, secondary media content selector 110 generates one or more metrics 120 that indicate information about a predicted flow of secondary media content provisioning availabilities. The secondary media content selector 110 may cause the second cryptographically protected record 112 to be written based, at least in part, on the one or more metrics 120. In an embodiment, the secondary media content selector 110 is referred to as a supply-side platform (SSP).

In some embodiments, set of records 108 includes one or more additional records 122. One or more computer systems 124, secondary media content controller 102, secondary media content selector 110, and/or some other suitable system and/or device may generate, write, access, and/or read records of one or more additional records 122. The additional records 122 may include one or more records of registration and/or revocation of registration of entities to procure provision of secondary media content, resource controllers, and/or systems and/or nodes that host set of records 108. The additional records 122 can include different types of records related to online engagement programs, such as registration records, online engagement program updates, resource hold records, secondary media content lot records, resource return records, resource transfer records, and/or other types of records used by a distributed application to perform aspects of establishing and updating online engagement programs, acquiring sets of secondary media content to be provided, attesting to valid presentation of secondary media content (e.g., to a viewer of a device), holding resources, transferring resources, refunding resources, and/or other suitable aspects performed in relation to online engagement programs and provision of secondary media content. Each record may be signed by each respective provider using their private encryption key. In some embodiments, one or more providers are referred to as vendors. One or more records in set of records 108 can belong to a series of records that are cryptographically linked together with cryptographic authenticators (e.g., digital signatures) such that modification of one record in the sequence causes a cryptographic authenticator to be valid in one or more or all of the subsequent records in the sequence. In some embodiments, secondary media content controller 102 includes a Uniform Resource Identifier (URI) (e.g., a Uniform Resource Locator (URL)) to terms of an entity to procure provision of secondary media content in a record in the set of records 108, such as in a record that includes information comprising computer-performable logic defining a set of cryptographic conditions that, when satisfied, causes a record in the distributed database to be included in the distributed database. Records in the distributed database can be a series of records that are cryptographically linked together with cryptographic authenticators (e.g., digital signatures) and may be referred to as a blockchain distributed record, and/or a blockchain. In various embodiments, computer systems 124 include systems of one or more service providers, such as a data measurement provider (DMP).

In an embodiment, secondary media content selector 110 causes secondary media content of one or more acquired sets to be provided. The secondary media content selector 110 may cause secondary media content to be provided by a secondary media content distribution system 126. The secondary media content provided can be included in and/or in the form of an image, text, video, audio, and/or some other suitable format. The secondary media content distribution system 126 may provide the secondary media content to a device 128 of a user 130. The secondary media content distribution system 126 may be referred to as a media content composer, a media content orchestrator, and/or some other suitable term. The secondary media content distribution system 126 may insert secondary media content in primary media content. This insertion may be referred to as stitching or some other suitable term. The secondary media content distribution system 126 may stitch together a media stream from primary and secondary content (e.g., for server-side secondary media content insertion). In some embodiments, where client-side secondary media content insertion is performed, a secondary media content stitcher is not used, and a player of a client application (e.g., running on device 128) inserts secondary media content into primary media content as it stitches together what to play. The primary media content can be information on a webpage, video content, audio content, and/or other suitable media content.

Although a single secondary media content controller 102, secondary media content selector 110, secondary media content distribution system 126, device 128, and user 130 are shown for clarity, it should be understood that multiple instances of such aspects and/or other aspects can be included in environment 100. One or more optional additional secondary media content selectors 132, also referred to as a secondary media content servers, may receive indications of secondary media provision opportunities from one or more secondary media content distribution systems 126, receive indications from one or more secondary media content selectors 110 and select which of the one or more secondary media content selectors 110 are to be used to provide secondary media content from their acquired sets to fulfill the secondary media provision opportunities. In various embodiments, one or more components and/or systems of environment 100 are in data communication with each other using one or more wired and/or wireless networks, not shown for clarity. One or more systems of environment 100 can include one or more components (e.g., one or more processors, memories, storage devices, user interface components such as a display or input device, networking components, and/or other suitable components), not shown for clarity.

The secondary media content controller 102 may record online engagement programs to records in the distributed database systems 106. The recorded online engagement program records may be publicly accessible. In an embodiment, an entity to procure provision of secondary media content or agency books an online engagement program in the secondary media content controller 102 and specifies a set of matching and/or filtering criteria to be used in providing secondary media content (e.g., serving impressions) from the online engagement program, along with an identifier of the secondary media content to be provided (e.g., a creative URL hosted in a content delivery network (CDN)). In various embodiments, the matching and/or filtering criteria include references to third party providers of various capabilities such as measurement, malware scanning of the secondary media content to be provided, viewability, supply quality, brand safety, and/or screening for desired characteristics. The matching and/or filtering criteria can include parameters to be used with those providers (e.g., expression and/or identifier of one or more desired characteristics to be used with a system of a specific screening service provider). The secondary media content controller 102 may record the record with a unique ID in the set of records 108, and may include a specification of service provider systems to be used, an online engagement program budget, start and end time information (e.g., date and/or time) of the online engagement program, particular constraints, and/or an identification of the secondary media content controller (e.g., ID of DSP).

In some embodiments, the set of records 108 is publicly visible and any secondary media content selector (e.g., secondary media content selector 110) or secondary media content distribution system (e.g., secondary media content distribution system 126) capable of meeting the required matching and/or filtering criteria (e.g., specified in first cryptographically protected record 104) may cause secondary media content indicated in set of available secondary media content to be provided, to be provided (e.g., to a device such as device 128). Secondary media content selectors that predict they will receive secondary media content provision requests that meet the matching and/or filtering criteria, can cause records to be recorded to the set of records 108 that indicate one or more available sets of secondary media content to be provided have been acquired by them (e.g., in a record such as second cryptographically protected record 112). For example, the acquisition may include information comprising computer-performable logic defining a set of cryptographic conditions that, when satisfied, causes an entry and/or record in the set of records 108 to be includable in the set of records 108. An entity to procure provision of secondary media content may use a secondary media content controller (e.g., secondary media content controller 102) to record an entry to set of records 108 that indicates a total set of secondary media content to be provided where the secondary media content is to be provided a specified number of times (e.g., 100,000 times), with subsets of available secondary media content to be provided indicated in particular quantities (e.g., in subsets of available secondary media content to be provided 1,000 times). A secondary media content selector (e.g., secondary media content selector 110) may record a record (e.g., second cryptographically protected record 112) that indicates an acquisition of an available set of secondary media content (e.g., that is to be provided 1,000 times) within a particular time period (e.g., a specified number of hours and/or minutes).

In some embodiments, the secondary media content selector then uses one or more specified provider application program interfaces (APIs) (e.g., locally in sidecar modules and/or over a network) to verify whether secondary media content provision opportunities (e.g., that it receives via requests and/or accesses) meet matching and/or filtering criteria recorded by the secondary media content controller (e.g., in the first cryptographically protected record 104), such as brand safety, viewability, screening rules, and/or other indicated criteria. A sidecar or sidecar module may be a containerized module that can be used to access information and/or use functions of a service provider by storing the sidecar locally in a computer system rather than accessing the data and/or functions of the service provider over a network. In some embodiments, the sidecar is backed by a remote service API.

If the matching criteria (e.g., specified to be used in providing the secondary media content) are met, the secondary media content selector may cause the secondary media content to be provided (e.g., by responding to a secondary content request from a secondary media content distribution system). In an embodiment, when the secondary media content is provided (e.g., displayed on device 128), secondary media content provision tracker events are sent to a data measurement provider (DMP) system 134 (e.g., also specified in the first cryptographically protected record 104), and systems of DMP perform one or more validation operations to validate that secondary media content was provided in a valid manner (e.g., not to a bot), and records aggregated validated counts of secondary media content provision to the set of records 108. The DMP system 134 may record the validated counts in one or more secondary media content distribution attestation records in additional records 122. Once the secondary media content controller verifies that the DMP confirmed provision of the secondary media content by recording an attestation of the validation to the set of records 108, the secondary media content controller can record the reduced remaining available sets of secondary media content to be provided to the set of records 108. If the secondary media content selector 110 cannot cause the acquired set of secondary media content to be provided before the acquisition expires, then the set and/or remaining opportunities of the set may be made available back in the set of records 108.

Figure 2:
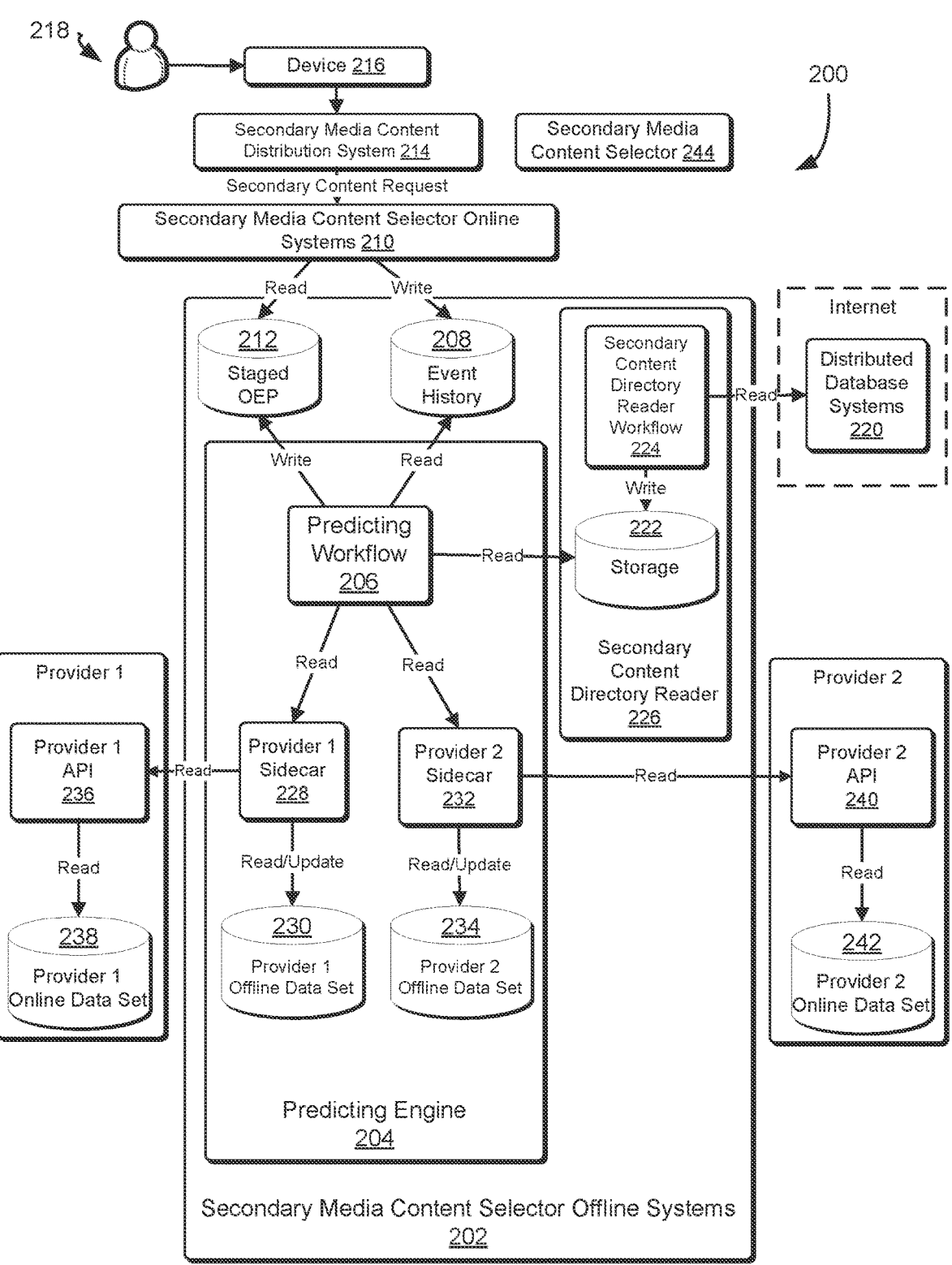
FIG. 2 illustrates an example diagram of a secondary media content selector offline flow in an environment, according to at least one embodiment.

FIG. 2 illustrates an example diagram of a secondary media content selector offline flow in an environment 200, according to at least one embodiment. The secondary media content selector 110 of FIG. 1 may perform one or more aspects of secondary media content selector offline flow. Secondary media content selector offline systems 202 can include a predicting engine 204 that uses a predicting workflow 206 to generate one or more metrics (e.g., one or more metrics 120 of FIG. 1) that indicate a predicted flow of secondary media content provisioning availabilities. The secondary media content selector offline systems 202 may be included in the secondary media content selector 110 of FIG. 1.

The predicting workflow 206 can use historical information about previous secondary content requests and secondary media content provision to generate the metrics that indicate the predicted flow of secondary media content provisioning availabilities. In various embodiments, predicting workflow 206 reads an event history 208 generated by one or more secondary media content selector online systems 210. The secondary media content selector online systems 210 may be included in secondary media content selector 110 of FIG. 1. In some embodiments, the secondary media content selector online systems 210 generate event information to write to the event history 208 based on information read from the staged online engagement programs (OEP) 212 and/or previous secondary content requests received from secondary media content distribution system 214. The secondary media content distribution system 214 may be the secondary media content distribution system 126 of FIG. 1. The secondary media content distribution system 214 can send secondary content requests based on indications received from a device 216 in response to actions of a user 218 using the device 216. In various embodiments, the predicting workflow 206 uses previous information from distributed database systems 220, stored in storage 222 by a secondary content directory reader workflow 224 of a secondary content directory reader 226. The secondary content directory reader 226 may be referred to as a distributed database reader, a secondary content catalog reader, or some other suitable term. The secondary content directory reader workflow 224 may use polling, may receive event notification of updates, and/or may read secondary content directory information and/or records in some other suitable manner. The distributed database systems 220 can be the distributed database systems 106 of FIG. 1.

The predicting workflow 206 may include reading and/or otherwise accessing information from one or more providers. A first provider may be referred to as Provider 1 and a second provider may be referred to as Provider 2. In various embodiments, reading information from providers can include reading information stored locally (e.g., in a sidecar module) or reading information using an application programming interface (API). The predicting engine 204 can include a Provider 1 sidecar 228 to read and update information in a Provider 1 offline data set 230. In some embodiments, predicting engine 204 includes a Provider 2 sidecar 232 to read and update information in a Provider 2 offline data set 234. The predicting workflow 206 may use a Provider 1 API 236 to access a Provider 1 online data set 238. In various embodiments, predicting workflow 206 uses a Provider 2 API 240 to access a Provider 2 online data set 242. Provider 1 and/or Provider 2 can be a service provider that provides certification of quality of secondary media content to be provided, screening for one or more desired characteristics (e.g., geographic, behavioral, age, gender, and/or other characteristics), and/or other suitable functions, services or data. In various embodiments, a different number of providers may be used. An optional secondary media content selector 244 may receive secondary content request from secondary media content distribution system 214 and select which of a plurality of secondary media content selector online systems 210 are to be used to provide secondary media content. The secondary media content selector 244 may be secondary media content selector 132 of FIG. 1. Although a single secondary media content distribution system 214, device 216, user 218, secondary media content selector online systems 210, and secondary media content selector offline systems 202 are shown for clarity, it should be understood that multiple instances of such aspects and/or other aspects can be included in environment 200.

Figure 3:
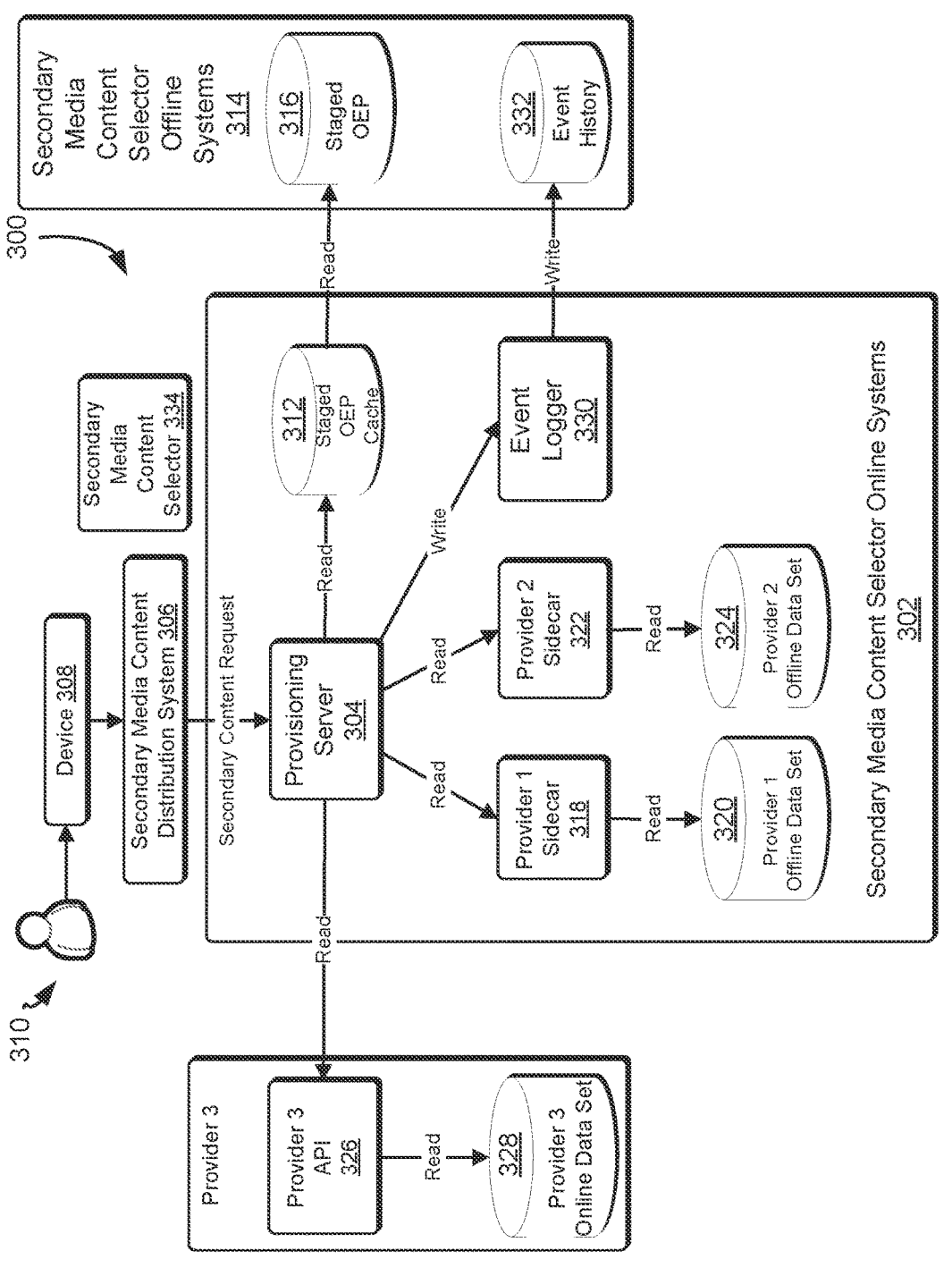
FIG. 3 illustrates an example diagram of a secondary media content selector online flow in an example environment, according to at least one embodiment.

FIG. 3 illustrates an example diagram of a secondary media content selector online flow in an example environment 300, according to at least one embodiment. The secondary media content selector 110 of FIG. 1 may perform one or more aspects of the secondary media content selector online flow. Secondary media content selector online systems 302 may include a provisioning server 304. The secondary media content selector online systems 302 may be included in secondary media content selector 110 of FIG. 1. In some embodiments, the secondary media content selector online systems 302 are secondary media content selector online systems 210 of FIG. 2. The provisioning server 304 may cause secondary media content to be provided by secondary media content distribution system 306 to a device 308 of a user 310 in response to one or more secondary content requests. In various embodiments, when a device, such as device 308, receives input from a user performing actions such as browsing a web page, utilizing a mobile application, or watching streaming video and/or listening to streaming audio, the device generates information (e.g., in a client-side secondary content insertion flow) that indicates a secondary media content provision opportunity is available, and the secondary media content distribution system generates a secondary content request based on the indicated secondary media content provision opportunity. In other situations, where the secondary content insertion flow is a server-side secondary content insertion flow, the device just reads and plays a media stream, is unaware of insertion of secondary content in primary content, and does not generate information that indicates a secondary media content provision opportunity is available. In some embodiments, an on-demand flow, such as a video on demand (VOD) flow, VOD fetches a secondary media content playlist to be inserted in primary video content, at a start of VOD to be presented, and a live flow fetches secondary media content to be inserted on-the-fly for live primary content. The secondary media content distribution system 306 can be the secondary media content distribution system 126 of FIG. 1.

The provisioning server 304 may cause secondary media content to be provided using a staged online engagement programs (OEP) cache 312. The secondary media content selector offline systems 314 may generate and/or store staged online engagement programs 316. The staged online engagement programs cache 312 may be read from the staged online engagement programs 316. The staged OEP cache 312 may be located closer to secondary media content selector request processing workflow logic (e.g., of provisioning server 304) in terms of network topology and/or latency than information in staged OEP 316, such that information in OEP cache 312 can be accessed and/or provided more quickly. The OEP cache 312 may be in memory of provisioning server 304. In some embodiments, the secondary media content selector offline systems 314 are the secondary media content selector offline systems 202 of FIG. 2 and/or the staged online engagement programs 316 are the staged online engagement programs 212 of FIG. 2. In some embodiments, once sets of secondary media content to be provided are successfully acquired, information indicating the acquisition (e.g., a lot of impressions) is cached and used to serve secondary content requests. In some embodiments, the provisioning server 304 matches ingress secondary content requests against cached lots (e.g., filtering using provider sidecars and APIs), substitutes tracking event macro variables for identifiers of the impression lot and/or other information, and responds to the secondary content request, causing the secondary media content to be provided to a device of a user.

The provisioning server 304 may read online and/or offline data from one or more providers. The provisioning server 304 may utilize a Provider 1 sidecar 318 to read data from a Provider 1 offline data set 320 and a Provider 2 sidecar 322 to read data from a Provider 2 offline data set 324. The provisioning server 304 may use a Provider 3 application programming interface (API) 326 to read data from a Provider 3 online data set 328. In various embodiments, Provider 1, Provider 2, and/or Provider 3 can be a service provider that provides data measurement (e.g., a DMP such as DMP system 134 of FIG. 1), certification of quality of secondary media content to be provided, screening for one or more desired characteristics (e.g., geographic, behavioral, age, gender, and/or other characteristics), and/or other suitable functions, services or data. In various embodiments, a different number of providers may be used. The provisioning server 304 may write information to an event logger 330. In an embodiment, the event logger 330 writes event information to an event history 332 of the secondary media content selector offline systems 314. The event history 332 may be the event history 208 of FIG. 2. An optional secondary media content selector 334 may receive secondary content request from secondary media content distribution system 306 and select which of a plurality of secondary media content selector online systems 302 are to be used to provide secondary media content. The secondary media content selector 334 may be secondary media content selector 132 of FIG. 1. Although a single secondary media content distribution system 306, device 308, user 310, secondary media content selector online systems 302, and secondary media content selector offline systems 314 are shown for clarity, it should be understood that multiple instances of such aspects and/or other aspects can be included in environment 300.

Particular input parameters may be passed to sidecar modules to access and/or read information. Service providers may specify input parameters that are to be passed to their sidecar module (e.g., by predicting workflow 206 of FIG. 2 and/or provisioning server 304 of FIG. 3). One or more aspects of a secondary media content selector (e.g., secondary media content selector 110 of FIG. 1) such as secondary media content selector offline systems 202 and/or secondary media content selector online systems 302 may request and/or read information from service providers that utilize one or more machine learning (ML) models to classify secondary content requests received at the secondary media content selector. The secondary content requests can arrive either in online information serving flows or in offline predicting or matching flows. To perform inference operations using the one or more ML models, the secondary media content selector may transform secondary content requests into primitive features that can be used as input using a transform mapping. The transform mapping from a secondary content request data structure (e.g., structured using Open RTB protocol) to feature primitives may be specified by the service provider. In various embodiments, there are a number of ways to specify the transform mapping, such that it can be applied by the information provisioning management online and offline flows at scale. These may include expressions such as JSON Path expressions or some other suitable expression, or templates such as Apache Velocity templates or some other suitable template. An example mapping for a desired geographic characteristic screening service provider, using JSON path expressions can be described by the following pseudocode:

```
{
    input: [
        protocol: "ortb-2.x",
        mapping: {
            programID: "A80EAD52-8DE2-4A2A-A160-DC08CFC98F5E",
            longitude: "${user.geo.lon}",
            latitude: "${user.geo.lat}",
            country: "${user.geo.country}",
            city: "${user.geo.city}",
            zip: "${user.geo.zip}"
        }
    ],
    output: {
        match: "bool",
        confidence: "int"
    }
}
```

Each service provider (e.g., having systems in computer systems 124 of FIG. 1, Provider 1 and/or Provider 2 of FIG. 2, and/or Provider 1, Provider 2, and/or Provider 3 of FIG. 3) may register their available services and cost for their services (e.g., specified as a fixed CPM) on the blockchain (e.g., in set of records 108 of FIG. 1). To ensure that only verified registration records are recorded on the blockchain, the service providers may post their public keys for use in validating their record signatures on their websites. Validator nodes may perform verification using the posted public key, and if a distributed database record digital signature does not pass validation using the website hosted key, the record would be invalid and not recorded on the blockchain. When an entity to procure provision of secondary media content creates an online engagement program (e.g., using secondary media content controller 102 of FIG. 1), it may accept terms and costs for service providers, and can include those as metadata in the online engagement program record (e.g., first cryptographically protected record 104). In some embodiments, documentation for service provider APIs and sidecar install instructions are referenced in the service provider registration records. As an example, such a specification (e.g., for a frequency capping service) can be described by the following pseudocode:

```
{
    providerId: 3030,
    providerName: "Provider_1",
    service Type: "freqCap",     // frequency capping
    service Version: 1,          // API version
    serviceDocs: "https://provider1-freqsystem.com/freqCap/docs/
```

-continued

```
index.html",
    // 50000 micro-USD Coin per 1000 imp == $0.05 CPM
    pricing: [ { type: "cpm",
        value: 50000,
        units: "uUSDC" } ],
    createdAt: 1700058120
}
```

If a provider wants to update one or more aspects of their specified services or cost, they can record a new registration on the blockchain, with a new version. In an embodiment, only the most recent record for combination of providerId, serviceType, and service Version is considered to be valid and available for use on online engagement programs.

Service providers can register on the blockchain with an ID and domain. This may generate a key pair, used for asymmetric encryption. In an embodiment, a private key is retained by the service provider and is used to generate a digital signature on each record the service provider writes to the blockchain (e.g., set of records 108 of FIG. 1). In various embodiments, a public key is posted on the blockchain, is hosted on the provider's website, or both, and is used to verify that the service-provider signed records are legitimate.

In some embodiments, two separate blockchains (e.g., sets of records in distributed database systems 106) are used. A first blockchain may be used for registration information, and can include registrations of entities to procure provision of secondary media content, service providers, resource controllers that cause the secondary media content to be provided, and/or other suitable registrations. The registrations can include their public encryption keys and indications of account information. A second blockchain may be used for online engagement programs, and can include online engagement program metadata, available sets of secondary media content to be provided (e.g., impression lots), acquisitions of sets of secondary media content to be provided, tracking event attestations (e.g., by DMPs), and/or other suitable metadata. In some embodiments, the second blockchain uses a sliding window such that online engagement programs whose end dates (e.g., flight dates) ended a predetermined time ago (e.g., 120 days or some other suitable time) are subject to being pruned off the blockchain in all nodes. In some embodiments, future online engagement programs cannot be created with end dates ending more than a predetermined time in the future (e.g., 120 days or some other suitable time). This may result in a sliding time window (e.g., of 240 days when 120 days is used for both predetermined time periods) of records being stored for the second blockchain. In some embodiments, entities to procure provision of secondary media content (e.g., that initially created the online engagement program) can record updates to the online engagement program end dates. In an embodiment, the first and second blockchains are implemented as a decentralized application using a virtual machine. Alternatively, rather than using two separate blockchains, different data sets may be recorded on the same blockchain, where the data sets can have different data retention requirements for distributed database nodes.

In at least one embodiment, as used in any implementation described herein, unless otherwise clear from context or stated explicitly to contrary, terms such as system, workflow, sidecar, predicting engine, API, module, and nominalized verbs (e.g., secondary media content controller, secondary media content selector, reader, poller, logger, provisioning server, controller, and/or other terms) each refers to any combination of software logic, firmware logic, hardware logic, and/or circuitry configured to provide functionality described herein. In at least one embodiment, software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth.

Figure 4:
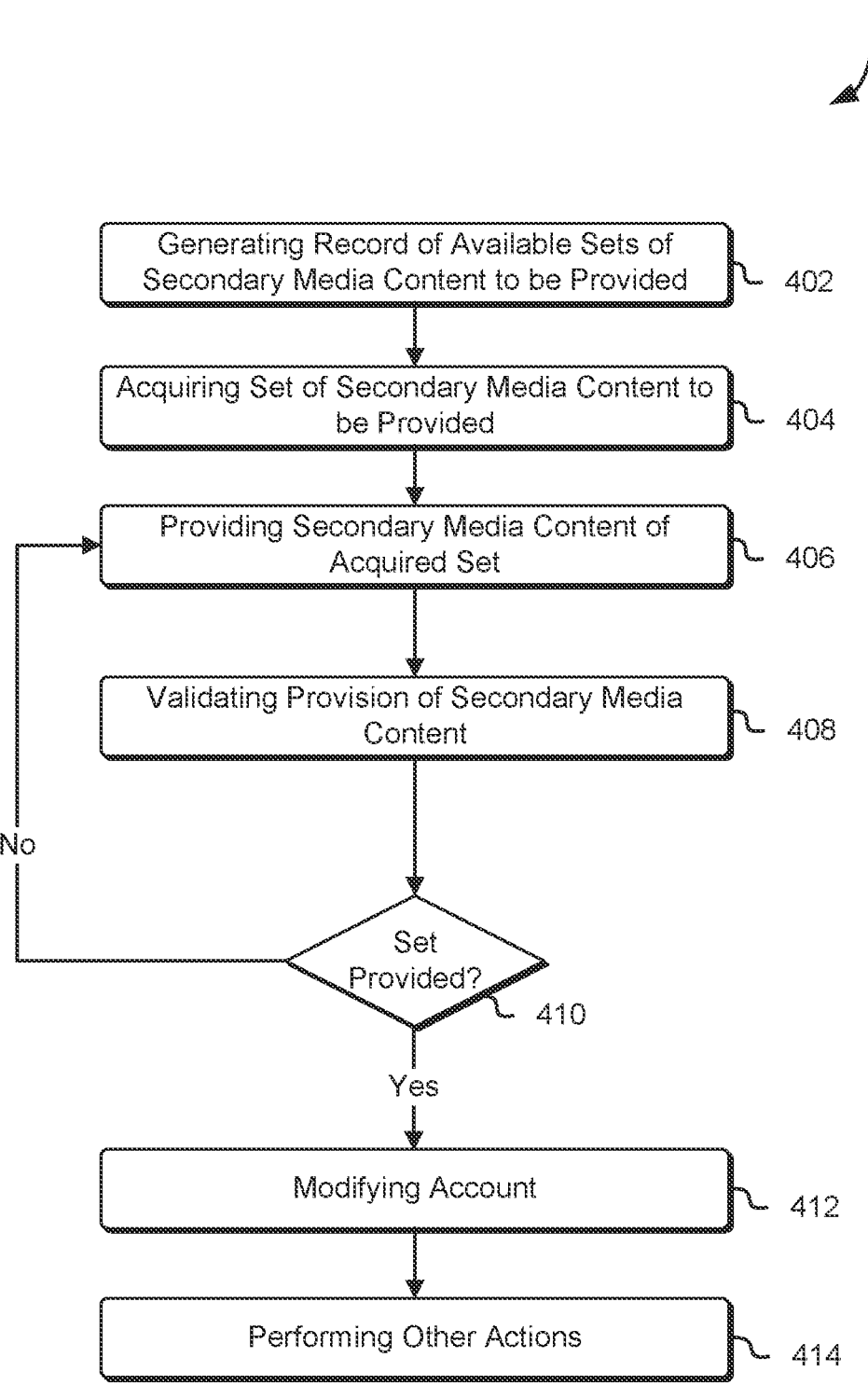
FIG. 4 is an example flowchart illustrating a technique of providing an acquired set of secondary media content to be provided, according to at least one embodiment.

FIG. 4 is an example flowchart illustrating a technique 400 of providing an acquired set of secondary media content to be provided, according to at least one embodiment. The set may be referred to as a lot, a bulk set, or some other suitable term. One or more components and/or systems shown and/or described with respect to FIG. 1, FIG. 2, FIG. 3, and/or FIG. 7 may perform one or more aspects of technique 400. In various embodiments, secondary media content controller 102, secondary media content selector 110, distributed database systems 106, secondary media content distribution system 126, and/or computer systems 124 perform one or more aspects of technique 400.

At a block 402, technique 400 may include generating a record of available sets of secondary media content to be provided (e.g., first cryptographically protected record 104 of FIG. 1 or some other suitable record). The record may be referred to as an online engagement program record. A secondary media content controller, such as secondary media content controller 102 of FIG. 1, may generate the record of available sets of secondary media content. In an embodiment, generating the record of available sets of secondary media content to be provided includes storing the record in a distributed database (e.g., a set of records of a distributed database system such as distributed database systems 106 of FIG. 1, distributed database systems 220 of FIG. 2, and/or some other suitable distributed database).

At a block 404, technique 400 may include acquiring a set of secondary media content to be provided. A secondary media content selector, such as secondary media content selector 110 of FIG. 1, may acquire the set of secondary media content to be provided. In some embodiments, acquiring the set of secondary media content to be provided includes storing a cryptographically protected record (e.g., second cryptographically protected record 112 of FIG. 1) in a distributed database that indicates the acquisition.

At a block 406, technique 400 may include providing secondary media content of the acquired set. Providing secondary media content can refer to presenting secondary media content. A secondary media content distribution system, such as secondary media content distribution system 126 of FIG. 1, secondary media content distribution system 214 of FIG. 2, and/or secondary media content distribution system 306 of FIG. 3, may provide secondary media content of the acquired set to a device. In various embodiments, the secondary media content selector causes, directly or indirectly, the secondary media content distribution system to provide the secondary media content of the acquired set. At a block 408, technique 400 may include validating provision of secondary media content. Validating provision of secondary media content can refer to validating presentation of secondary media content. In an embodiment, a service provider, such as DMP system 134 of FIG. 1 validates the provision of secondary media content using secondary media content provision tracker events and/or variables included in provided secondary media content.

At a decision block 410, technique 400 may include determining whether secondary media content of the acquired set has been provided. A secondary media content selector (e.g., provisioning server 304 of secondary media content selector online systems 302 of FIG. 3) may determine whether secondary media content of the acquired set has been provided. In some embodiments, a DMP such as DMP system 134 of FIG. 1 may determine whether secondary media content of the acquired set has been provided. In some embodiments, if the set of secondary media content has not been provided, technique 400 returns to block 406 to provide additional secondary media content of the acquired set. In some embodiments, determining whether secondary media content of the acquired set has been provided also includes determining whether an expiration of a time to provide the set of acquired secondary media content has been reached and/or whether an expiration of an online engagement program that includes the acquired set of secondary media has been reached, such that technique 400 returns to block 406 if the determined expiration(s) have not been reached and there is still secondary media content of the set to be provided.

If, at decision block 410, the set of secondary media content has been provided, technique 400 may proceed to a block 412. In at least one embodiment, at block 412, technique 400 includes modifying an account. Modifying an account may include crediting an account in response to a third record was added to a distributed database (e.g., a record in additional records 122 of FIG. 1) that includes information that indicates content of the acquired one or more sets was attested to be properly provided by a system (e.g., a DMP) indicated in the first cryptographically protected record. This third record may be a type of record referred to as a secondary content distribution attestation record and/or some other suitable name. For example, a secondary media content controller may have recorded a resource hold record to cause resources to be held until secondary media content of a lot was attested to be provided. A resource hold record may indicate a set of resources are in escrow. When secondary media content is attested to have been provided, a portion of the held resources may be transferred to service providers involved in providing the secondary media content (e.g., to a secondary media content selector that acquired the lot and to a DMP that recorded the attestation). The resources may be transferred in response to validator nodes validating the attestation record using logic of a distributed application. The distributed application may use information contained in multiple record types to cause the transfers to be performed, such as by identifying accounts using information in registration records and/or online engagement program configuration records, a lot acquisition record, and a secondary content viewing attestation record. The transfers may be recorded in one or more resource transfer records. The transfers may be referred to as payment.

At a block 414, technique 400 can include performing other actions. Performing other actions may include returning to block 406 to provide secondary media content of a different acquired set. In some embodiments, performing other actions includes recording one or more records to update the available sets of secondary media content to be provided. Performing other actions may include performing a resource return if secondary content is not provided by an expiration time and/or date. The resource can be an amount of cryptocurrency or some other digital asset. The resource return may be referred to as a refund. The resource return may be to a secondary media content controller that recorded a resource hold record, and the resource return may be recorded using a resource return record. Validation nodes may automatically cause the resource return to be performed and/or the resource return record to be recorded using logic of a decentralized application. In some embodiments, logic of the decentralized application is referred to as a smart contract.

Figure 5:
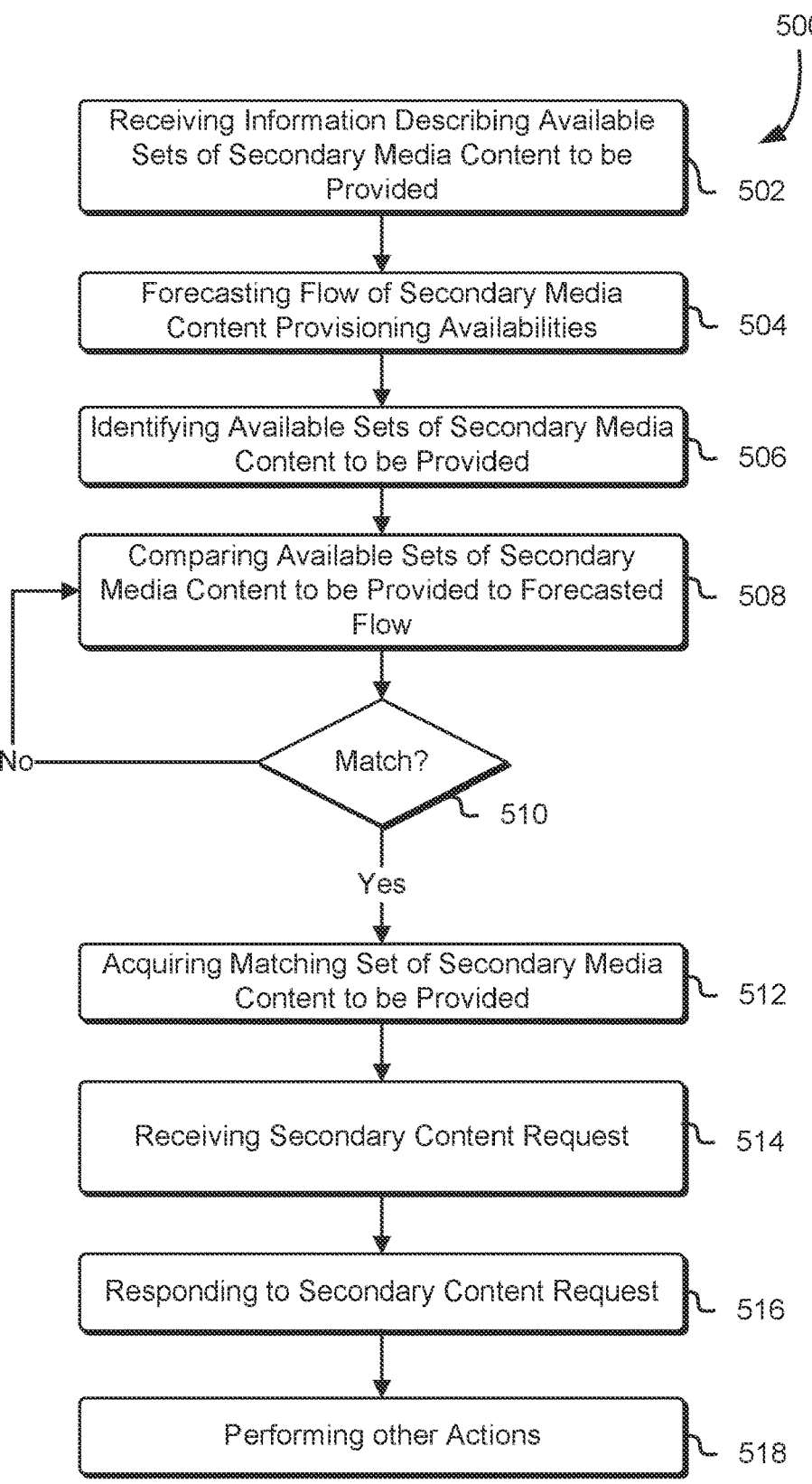
FIG. 5 is an example flowchart illustrating a technique of acquiring and providing a set of secondary media content, according to at least one embodiment.

FIG. 5 is an example flowchart illustrating a technique 500 of acquiring and providing a set of secondary media content, according to at least one embodiment. The set may be referred to as a lot, a bulk set, or some other suitable term. One or more components and/or systems shown and/or described with respect to FIG. 1, FIG. 2, FIG. 3, and/or FIG. 7 may perform one or more aspects of technique 500. The secondary media content controller 102, secondary media content selector 110, distributed database systems 106, secondary media content distribution system 126, and/or computer systems 124 may perform one or more aspects of technique 500.

At a block 502, technique 500 may include receiving information describing available sets of secondary media content to be provided. The information describing available sets of secondary media content to be provided can be included in one or more records of a distributed database (e.g., first cryptographically protected record 104 of FIG. 1 and/or some other suitable cryptographically protected record). The information describing available sets of secondary media content to be provided can be from multiple online engagement programs and/or multiple lots of secondary media to be provided for each online engagement program. One or more components of the secondary media content selector offline systems 202 of FIG. 2 (e.g., predicting engine 204 and/or secondary content directory reader 226) may receive the information describing available sets of secondary media content to be provided.

At a block 504, technique 500 may include predicting a flow of secondary media content provisioning availabilities. The predicting engine 204 of FIG. 2 may predict the flow using the predicting workflow 206. Predicting the flow of secondary media content provisioning availabilities can include generating one or more metrics that indicate information about the predicted flow (e.g., one or more metrics 120 of FIG. 1).

At a block 506, technique 500 may include identifying available sets of secondary media content to be provided. The secondary media content selector 110 of FIG. 1 may identify available sets of secondary media content to be provided by reading one or more records in set of records 108. In some embodiments, the available sets of secondary media content to be provided are indicated in records generated by secondary media content controllers such as secondary media content controller 102 of FIG. 1.

At a block 508, technique 500 may include comparing available sets of secondary media content to be provided to the predicted flow. Comparing available sets of secondary media content to be provided to the predicted flow can include evaluating event history (e.g., logs) against all available online engagement programs for a particular upcoming time period, or for a next upcoming time period. In various embodiments, at a decision block 510, technique 500 includes determining whether available sets of secondary media content match predicted flow. The secondary media content selector 110 of FIG. 1 and/or predicting engine 204 of FIG. 2 may compare available sets of secondary media content to the predicted flow and may determine whether one or more criteria and/or parameters of the available sets of secondary media content match the predicted flow. In some embodiments, an available set of secondary media content matches predicted flow if a predicted probability of being able to provide the secondary media content in the available set of secondary media content is greater than a predetermined threshold. In some embodiments, decision of whether match is present is based on whether or not a forecasted volume of matching requests is above a predetermined threshold. The decision may be based on both a match rate of multiple requests and an overall volume of those requests. Determining whether available sets of secondary media content match predicted flow can also include identifying online engagement programs that best use resources available to secondary media content selector, and selecting sets of secondary media content to be provided based on matching and/or filtering criteria. Selecting sets of media content to be provided can include ignoring (e.g., not selecting) one or more online engagement program even if a match is found (e.g., because sets of secondary media content to be provided from other online engagement programs make better use of resources available to secondary media content selector). If they do not match at decision block 510, technique 500 may return to block 508 to compare additional available sets of secondary media content to the predicted flow.

If an available set of secondary media content matches the predicted flow at decision block 510, technique 500 may proceed to block 512, which includes acquiring the matching set of secondary media content to be provided. Acquiring the matching set of secondary media content can include causing a cryptographically protected record (e.g., second cryptographically protected record 112 of FIG. 1) to be written to a distributed database that indicates acquisition of the set by a particular secondary media content selector (e.g., to a particular SSP). Acquiring the matching set of secondary media content may include performing one or more aspects of acquiring the set of secondary media content to be provided at block 404 of FIG. 4. In some embodiments, technique 500 can return to block 508 to enable offline flow of secondary media content selector to generate a collection of sets of secondary media content to be provided from multiple online engagement programs, before caching the sets of secondary media content to be provided to be ready to serve in response to secondary media content requests.

At a block 514, technique 500 may include receiving a secondary content request. The secondary content request may be referred to as a secondary media content request and/or some other suitable term. A provisioning server of secondary media content selector online systems 302 of FIG. 3 may receive the secondary content request from a secondary media content distribution system (e.g., when device 308 of user 310 loads a particular web page that includes a secondary media content provision opportunity). At a block 516, technique 500 may include responding to the secondary content request. The secondary media content selector online systems 302 may respond to secondary content request using the staged online engagement programs cache 312. Responding to the secondary content request can include causing a secondary media content distribution system (e.g., secondary media content distribution system 306) to display and/or otherwise provide the secondary media content using a device of a user. Responding to the secondary content request may include performing one or more aspects of providing secondary media content of the acquired set at block 406 of FIG. 4.

At a block 518, technique 500 may include performing other actions. Performing other actions can include returning to block 502 to receive additional information describing available sets of secondary media content to be provided. In some embodiments, performing other actions includes returning to block 514 to receive additional secondary content requests until the set has been provided (e.g., determining whether set has been provided at decision block 410 of FIG. 4).

Figure 6:
FIG. 6 is an example flowchart illustrating a technique of validating provision of secondary media content, according to at least one embodiment.
Figure 6:
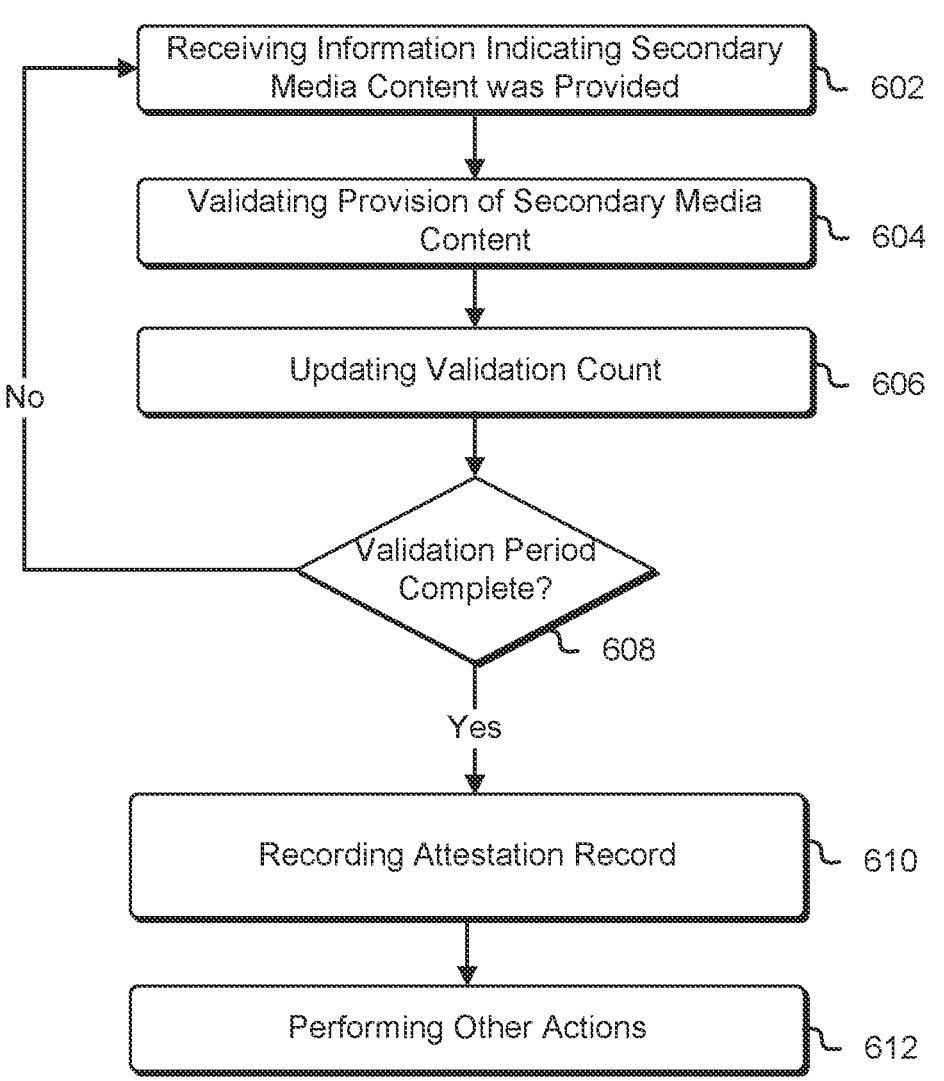

FIG. 6 is an example flowchart illustrating a technique 600 of validating provision of secondary media content, according to at least one embodiment. One or more components and/or systems shown and/or described with respect to FIG. 1, FIG. 2, FIG. 3, and/or FIG. 7 may perform one or more aspects of technique 600. One or more DMP systems such as DMP system 134 of FIG. 1 and/or some other suitable computer system may perform one or more aspects of technique 600.

At a block 602, technique 600 may include receiving information indicating secondary media content was provided. At a block 604, technique 600 may include validating provision of the secondary media content. Validating provision of the secondary media content can refer to validating presentation of the secondary media content. Validating provision of secondary media content can include validating that the secondary media content was provided to a device of a user that satisfies one or more demographic criteria. In some embodiments, validating provision of the secondary media content includes one or more of validating traffic to detect and filter out invalid activity, bots, unapproved supply paths (e.g., from a file that indicates entities authorized to supply), and/or other types of validation. One of more computer systems (e.g., of computer systems 124 of FIG. 1) of a service provider (e.g., a data measurement provider (DMP)) may perform validation of the secondary media content provision.

At a block 606, technique 600 may include updating a validation count. Updating the validation count can include incrementing the validation count if the provision of secondary media content was determined to be valid at block 604. Updating the validation count may be performed for a particular lot of secondary media content to be provided of a particular online engagement program as technique 600 is performed for multiple online engagement programs by a DMP. At a decision block 608, technique 600 may include determining whether a validation period is complete. If the validation period is not complete, technique 600 may return to block 602 to receive additional information indicating secondary media content was provided. Validation period can be a predetermined time period (e.g., in hours and/or minutes) or a predetermined number of indications received indicating that secondary media content was provided. If, at decision block 608, the validation period is complete, technique 600 may include recording an attestation record (e.g., in a record of one or more additional records 122 of FIG. 1) at a block 610. At a block 612, technique 600 may include performing other actions. In an embodiment, performing other actions includes starting another validation period, resetting a validation count, and/or returning to block 602 to receive additional information.

In at least one embodiment, one or more aspects of one or more of technique 400, technique 500, and/or technique 600 is a computer-implemented method (e.g., using one or more components and/or systems of FIG. 1, FIG. 2, FIG. 3, FIG. 7, and/or some other suitable system). One or more aspects of one or more of technique 400, technique 500, and/or technique 600 can include generating one or more metrics (e.g., one or more metrics 120 of FIG. 1) that indicate information about a predicted flow of secondary media content provisioning availabilities. One or more aspects of one or more of technique 400, technique 500, and/or technique 600 can include identifying in a first cryptographically protected record (e.g., first cryptographically protected record 104 of FIG. 1 or some other suitable entry or record) in a distributed database (e.g., records of a distributed database system such as distributed database systems 106 of FIG. 1, distributed database systems 220 of FIG. 2, and/or some other suitable distributed database system), one or more available sets of secondary media content to be provided, one or more indications of one or more systems to be used (e.g., one or more systems of computer systems 124 of FIG. 1; one or more systems and/or data sets of Provider 1 and/or Provider 2 of FIG. 2; one or more systems and/or data sets of Provider 1, Provider 2, and/or Provider 3 of FIG. 3, and/or some other suitable set of systems), and one or more secondary media content provisioning criteria. One or more aspects of one or more of technique 400, technique 500, and/or technique 600 can include causing a second cryptographically protected record (e.g., second cryptographically protected record 112 of FIG. 1 or some other suitable record) to be written to the distributed database that includes an acquisition of one or more of the one or more available sets based, at least in part, on the one or more metrics, the one or more indications of one or more systems, and the one or more provisioning criteria. In at least one embodiment, one or more aspects of one or more of technique 400, technique 500, and/or technique 600 include identifying, in response to a secondary content request (e.g., a secondary content request received by provisioning server 304 from secondary media content distribution system 306 of FIG. 3, or some other suitable secondary content request), that the secondary content request meets the one or more secondary media content provisioning criteria using one or more of the indicated one or more systems, causing one or more monitoring event variables to be included with secondary media content of the one or more acquired available sets, and causing secondary media content of the one or more acquired sets to be provided. The one or more secondary media content provisioning criteria can be filtering and matching criteria that include a set of required criteria. In some embodiments, online engagement programs can include required and preferred or optional criteria, where the required criteria must all be met for a DMP to provide attestation that secondary media content provision was valid. The preferred or optional criteria may be described by the DMP (e.g., indicating which were met in the attestation record), but may not need to be met before attesting that the secondary media content provision was valid. The DMP may utilize one or more service providers (e.g., Provider 1 API 236, Provider 1 sidecar 228, Provider 2 sidecar 232, and/or some other suitable provider API or sidecar) to perform its own examination of the validity of the secondary media content provision, which may include validating the selection and presentation of the secondary media content. One or more secondary media content provisioning criteria can include criteria of devices (e.g., device is a particular type of device or device is associated with a user that meets one or more criteria) to which the secondary media content is to be provided (e.g., to device 128 of FIG. 1, device 216 of FIG. 2, device 308 of FIG. 3, and/or some other suitable device). In various embodiments, the one or more secondary media content provisioning criteria include one or more of a date range, an age range, an interest identifier, and a geographic location identifier. Although particular secondary media content provisioning criteria are mentioned, it should be understood that other types of criteria may be used such as day-parting, brand safety of a website and/or content stream where it is presented, whether a device and/or user of the device is a member of a predefined audience group or other type of group, is not a member of a predefined audience group or other type of group, and/or other suitable criteria. The secondary media content provisioning criteria may be referred to as presentation criteria and may be applied to filter and match secondary content requests. In an embodiment, one or more aspects of technique 400, 500, and/or 600 further includes receiving an indication that an account was credited in response to a third record (e.g., a record of additional records 122 of FIG. 1) was added to the distributed database that includes information that indicates content of the acquired one or more sets was attested to be properly provided (e.g., in a record of additional records 122 of FIG. 1) by a system indicated in the first cryptographically protected record. In some embodiments, causing the secondary media content of the one or more acquired sets to be provided is based, at least in part, on a ranking of the one or more acquired sets in relation to the one or more other acquired sets. The secondary content request can include a set of data that corresponds to a set of parameter fields, and identifying that the secondary content request meets the one or more secondary media content provisioning criteria can include comparing data of one or more fields of the set of parameter fields with one or more of the one or more secondary media content provisioning criteria. In some embodiments, comparing the data with the criteria can include mapping fields from requests into matching and/or filtering features. The one or more monitoring event variables can include an identifier of a set indicated to be acquired in the second cryptographically protected record.

In various embodiments, a system (e.g., secondary media content selector 110 of FIG. 1, secondary media content selector offline systems 202 of FIG. 2, secondary media content selector online systems 302 of FIG. 3, a system of FIG. 7, and/or some other suitable system) includes at least one computing device configured to implement one or more services, where the one or more services predict a flow of secondary media content provisioning availabilities (e.g., using predicting workflow 206 of FIG. 2), identify, in a first cryptographically protected record in a distributed database (e.g., first cryptographically protected record 104 in distributed database systems 106 of FIG. 1), one or more available sets of secondary media content to be provided based, at least in part, on the predicted flow, and cause a second cryptographically protected record (e.g., second cryptographically protected record 112 of FIG. 1) to be written to the distributed database that indicates an acquisition of the one or more available sets. In some embodiments, the one or more services cause a monitoring event variable to be included with secondary media content of the one or more acquired available sets that identifies a set indicated to be acquired in the second cryptographically protected record. In an embodiment, the one or more services are to cause secondary media content of the one or more acquired available sets to be provided (e.g., to device 128 of FIG. 1, device 216 of FIG. 2, device 308 of FIG. 3, and/or some other suitable device). In various embodiments, each of the available sets of secondary media content indicate that the secondary media content is to be provided a plurality of times. In embodiments, the one or more services are to identify one or more secondary media content provisioning criteria in the first cryptographically protected record and cause the second cryptographically protected record to be written to the distributed database based, at least in part, on the one or more provisioning criteria. In some embodiments, the first cryptographically protected record includes one or more secondary media content provisioning criteria and the one or more services are to cause the second cryptographically protected record to be written to the distributed database based, at least in part, on the predicted flow of secondary media content provisioning availabilities and the one or more secondary media content provisioning criteria. For example, in an embodiment, the first cryptographically protected record indicates a set of systems to be used (e.g., one or more systems of computer systems 124 of FIG. 1; one or more systems and/or data sets of Provider 1 and/or Provider 2 of FIG. 2; one or more systems and/or data sets of Provider 1, Provider 2, and/or Provider 3 of FIG. 3, and/or some other suitable set of systems). In some embodiments, the first cryptographically protected record was caused to be recorded by a secondary media content controller (e.g., secondary media content controller 102 of FIG. 1) and indicates one or more of a DMP to be used (e.g., data measurement provider system 134 of FIG. 1), one or more dates that indicate a span of time that on online engagement program is to be in effect, and one or more service provider systems (e.g., Provider 3 API 326, Provider 1 Sidecar 318, Provider 2 Sidecar 322 of FIG. 3, and/or some other suitable service provider) to be used to match one or more secondary media content provisioning criteria. Although particular aspects are mentioned as being recorded or caused to be recorded by a secondary media content controller in the first cryptographically protected record, it should be understood that these and other aspects (e.g., information that indicates resources to be held in escrow) can be recorded by a DSP such as secondary media content controller 102 in a different cryptographically protected record (e.g., in one or more of additional records 122). The records caused to be recorded by the DSP may record an identifier of the DSP that can be used to obtain additional information about the DSP from one or more registration records. In some embodiments, the records are referred to as being recorded by a secondary media content controller rather than caused to be recorded by a secondary media content controller.

In various embodiments, a non-transitory computer-readable storage medium storing thereon executable instructions that, as a result of being executed by one or more processors (e.g., processor 114 of FIG. 1 and/or some other suitable processor) of a computer system (e.g., secondary media content selector 110 of FIG. 1, secondary media content selector offline systems 202 of FIG. 2, secondary media content selector online systems 302 of FIG. 3, a system of FIG. 7, and/or some other suitable system), cause the computer system to: identify, in a first cryptographically protected record (e.g., first cryptographically protected record 104 of FIG. 1) in a distributed database (e.g., a set of records such as set of records 108 in distributed database systems 106 of FIG. 1, distributed database systems 220 of FIG. 2, and/or some other suitable distributed database system), one or more available sets of secondary media content to be provided; cause a second cryptographically protected record (e.g., second cryptographically protected record 112 of FIG. 1) to be written to the distributed database that indicates an acquisition of one or more of the one or more available sets, where secondary media content corresponding to each of the acquired available sets is to be provided a plurality of times; and cause secondary media content of the one or more acquired available sets to be provided (e.g., to device 128 of FIG. 1, device 216 of FIG. 2, device 308 of FIG. 3, and/or sone other suitable device).

In some embodiments, the instructions further include instructions that, as a result of being executed by the one or more processors, cause the computer system to compare the identified one or more available sets of secondary media content to be provided to one or more metrics (e.g., one or more metrics 120 of FIG. 1) that indicate information about a predicted flow of secondary media content provisioning availabilities, and identify one or more sets to be acquired based, at least in part, on the comparison. In an embodiment, the first cryptographically protected record includes one or more indications of one or more systems to be used (e.g., one or more systems of computer systems 124 of FIG. 1, one or more systems of Provider 1, Provider 2, and/or Provider 3 of FIG. 2 and/or FIG. 3, and/or some other suitable set of systems) and the instructions, as a result of being executed by the one or more processors, cause the computer system to perform one or more application programming interface (API) calls to one or more computer systems of the one or more indicated systems (e.g., reading and/or accessing information of: one or more computer systems 124 of FIG. 1; Provider 1, and/or Provider 2 of FIG. 2 using Provider 1 sidecar 228, Provider 2 sidecar 232, Provider 1 API 236, and/or Provider 2 API 240; Provider 1, Provider 2, and/or Provider 3 of FIG. 3 using Provider 1 sidecar 318, Provider 2 sidecar 322, and/or Provider 3 API 326; and/or information of some other suitable computer system). In some embodiments, the first cryptographically protected record includes one or more indications of criteria to be used, and the instructions, as a result of being executed by the one or more processors, cause the computer system to cause secondary media content of the one or more acquired available sets to be provided based, at least in part, on the criteria. In an embodiment, the second cryptographically protected record (e.g., second cryptographically protected record 112 of FIG. 2) identifies a system by which the one or more sets have been acquired. In various embodiments, the instructions, as a result of being executed by the one or more processors, cause the computer system to cache information (e.g., in staged online engagement programs cache 312 of FIG. 3, storage 118 and/or memory 116 of FIG. 1, and/or some other suitable storage and/or memory) corresponding to the acquisition of the one or more available sets, and cause the secondary media content to be provided in response to a secondary content request (e.g., a secondary content request received by provisioning server 304 from secondary media content distribution system 306 of FIG. 3, or some other suitable secondary content request) based, at least in part, on the cached information (e.g., in staged OEP cache 312 of FIG. 3). In some embodiments, the instructions, as a result of being executed by the one or more processors, cause the computer system to, in response to a secondary content request, access demographic information using a system (e.g., one or more systems of computer systems 124 of FIG. 1; one or more systems and/or data sets of Provider 1 and/or Provider 2 of FIG. 2; one or more systems and/or data sets of Provider 1, Provider 2, and/or Provider 3 of FIG. 3, and/or some other suitable set of systems) indicated in the first cryptographically protected record, and cause the secondary media content to be provided based, at least in part, on the accessed demographic information. The demographic information may be a type of matching and/or filtering criteria. In some embodiments, other types of matching and/or filtering criteria can be used such as day-parting, brand safety, membership in a particular audience, not being a member of a particular audience, and/or other suitable types of matching and/or filtering criteria. The computer system may, in response to a secondary content request, access one or more of the other types of matching and/or filtering criteria, and cause the secondary media content to be provided based, at least in part on the accessed matching and/or filtering criteria.

Figure 7:
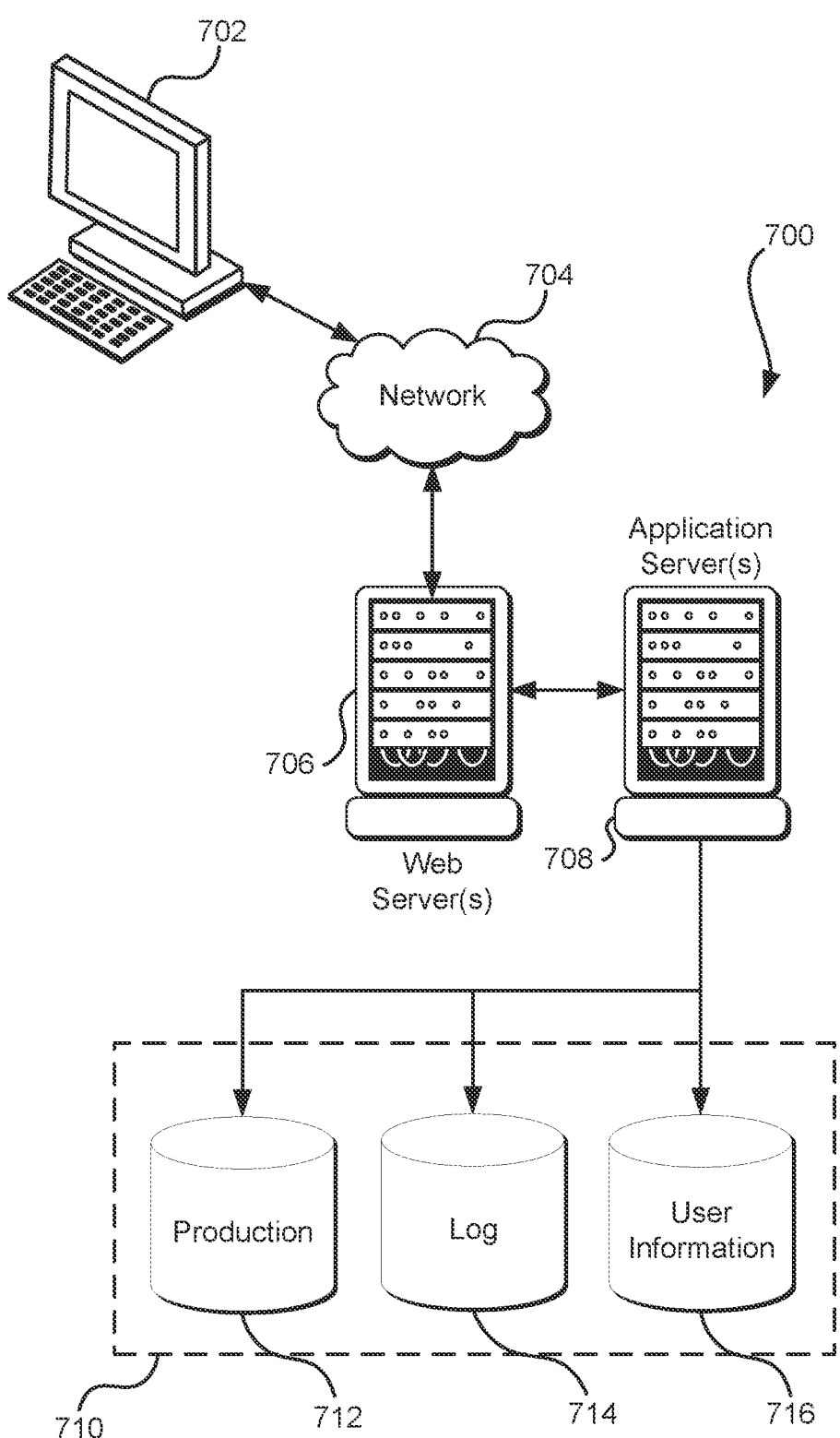
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. For example, other types of systems and/or system configurations may be used for streaming media playback on mobile devices. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), one or more streaming media protocols such as Dynamic Adaptive Streaming over HTTP (MPEG-DASH) or HTTP Live Streaming (HLS), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and application servers. In an embodiment, the one or more servers are also capable of executing programs or scripts in response to requests from user devices, such as by executing one or more web applications that are implemented as one or more scripts or programs written in any programming language, such as Java, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

29

What is claimed is:

1. A computer-implemented method, comprising:

generating one or more metrics that indicate information about a predicted flow of secondary media content provisioning availabilities;

identifying, in a first cryptographically protected record in a distributed database, one or more available sets of secondary media content to be provided, one or more indications of one or more systems to be used, and one or more secondary media content provisioning criteria;

causing a second cryptographically protected record to be written to the distributed database that indicates an acquisition of one or more of the one or more available sets based, at least in part, on the one or more metrics, the one or more indications of one or more systems, and the one or more secondary media content provisioning criteria;

identifying, in response to a secondary content request, that the secondary content request meets the one or more secondary media content provisioning criteria using one or more of the indicated one or more systems;

causing one or more monitoring event variables to be included with secondary media content of the one or more acquired available sets; and causing secondary media content of the one or more acquired sets to be provided.

2. The computer-implemented method of claim 1, wherein the one or more secondary media content provisioning criteria includes criteria of devices to which the secondary media content is to be provided.

3. The computer-implemented method of claim 1, wherein the one or more secondary media content provisioning criteria include one or more of a date range, an age range, an interest identifier, and a geographic location identifier.

4. The computer-implemented method of claim 1, further comprising receiving an indication that an account was credited in response to a third record was added to the distributed database that includes information that indicates content of the acquired one or more sets was attested to be properly provided by a system indicated in the first cryptographically protected record.

5. The computer-implemented method of claim 1, wherein the secondary content request includes a set of data that corresponds to set of parameter fields, and identifying that the secondary content request meets the one or more secondary media content provisioning criteria includes comparing data of one or more fields of the set of parameter fields with one or more of the one or more secondary media content provisioning criteria.

6. The computer-implemented method of claim 1, wherein the one or more monitoring event variables include an identifier of a set indicated to be acquired in the second cryptographically protected record.

7. A system, comprising at least one computing device configured to implement one or more services, wherein the one or more services:

predict a flow of secondary media content provisioning availabilities;

identify, in a first cryptographically protected record in a distributed database, one or more available sets of secondary media content to be provided based, at least in part, on the predicted flow; and cause a second cryptographically protected record to be written to the distributed database that indicates an acquisition of one or more of the one or more available sets.

8. The system of claim 7, wherein the one or more services cause a monitoring event variable to be included with secondary media content of the one or more acquired available sets that identifies a set indicated to be acquired in the second cryptographically protected record.

9. The system of claim 7, wherein the one or more services are to cause secondary media content of the one or more acquired available sets to be provided.

10. The system of claim 7, wherein individual ones of the available sets of secondary media content indicate that the secondary media content is to be provided a plurality of times.

11. The system of claim 7, wherein the one or more services are to identify one or more secondary media content provisioning criteria in the first cryptographically protected record and cause the second cryptographically protected record to be written to the distributed database based, at least in part, on the one or more provisioning criteria.

12. The system of claim 7, wherein the first cryptographically protected record includes one or more secondary media content provisioning criteria and the one or more services are to cause the second cryptographically protected record to be written to the distributed database based, at least in part, on the predicted flow of secondary media content provisioning availabilities and the one or more secondary media content provisioning criteria.

13. The system of claim 7, wherein the first cryptographically protected record was recorded by a secondary media content controller and indicates one or more of a data measurement provider to be used, one or more dates that indicate a span of time that an online engagement program is to be in effect, and one or more service provider systems to be used to match one or more secondary media content provisioning criteria.

14. A non-transitory computer-readable storage medium storing thereon executable instructions that, as a result of being executed by one or more processors of a computer system, cause the computer system to:

identify, in a first cryptographically protected record in a distributed database, one or more available sets of secondary media content to be provided;

cause a second cryptographically protected record to be written to the distributed database that indicates an acquisition of one or more of the one or more available sets, where secondary media content corresponding to individual ones of the acquired one or more available sets is to be provided a plurality of times; and cause secondary media content of the one or more acquired available sets to be provided.

15. The non-transitory computer-readable storage medium of claim 14, wherein the instructions further comprise instructions that, as a result of being executed by the one or more processors, cause the computer system to compare the identified one or more available sets of secondary media content to be provided to one or more metrics that indicate information about a predicted flow of secondary media content provisioning availabilities, and identify one or more sets to be acquired based, at least in part, on the comparison.

16. The non-transitory computer-readable storage medium of claim 14, wherein the first cryptographically protected record includes one or more indications of one or more systems to be used and the instructions, as a result of being executed by the one or more processors, cause the computer system to perform one or more application programming interface (API) calls to one or more computer systems of the one or more indicated systems.

17. The non-transitory computer-readable storage medium of claim 14, wherein the first cryptographically protected record includes one or more indications of criteria to be used, and the instructions, as a result of being executed by the one or more processors, cause the computer system to cause secondary media content of the one or more acquired available sets to be provided based, at least in part, on the criteria.

18. The non-transitory computer-readable storage medium of claim 14, wherein the second cryptographically protected record identifies a system by which the one or more sets have been acquired.

19. The non-transitory computer-readable storage medium of claim 14, wherein the instructions, as a result of being executed by the one or more processors, cause the computer system to cache information corresponding to the acquisition of the one or more available sets, and cause the secondary media content to be provided in response to a secondary content request based, at least in part, on the cached information.

20. The non-transitory computer-readable storage medium of claim 14, wherein the instructions, as a result of being executed by the one or more processors, cause the computer system to, in response to a secondary content request, access demographic information using a system indicated in the first cryptographically protected record, and cause the secondary media content to be provided based, at least in part, on the accessed demographic information.

* * * * *